J. S. WEARN.
DESTINATION BOARD FOR TRAM CARS AND THE LIKE.
APPLICATION FILED JAN. 11, 1912.

1,044,715.

Patented Nov. 19, 1912.

WITNESSES:
John C. Sanders
John A. Percival

INVENTOR:
James Stewart Wearn
BY
ATTY

UNITED STATES PATENT OFFICE.

JAMES STEWART WEARN, OF CHRISTCHURCH, NEW ZEALAND.

DESTINATION-BOARD FOR TRAM-CARS AND THE LIKE.

1,044,715.   Specification of Letters Patent.   Patented Nov. 19, 1912.

Application filed January 11, 1912. Serial No. 670,561.

*To all whom it may concern:*

Be it known that I, JAMES STEWART WEARN, subject of the King of Great Britain, residing at 134 Hereford street, Christchurch, in the Dominion of New Zealand, have invented new and useful Improvements Relating to the Destination-Boards of Tram-Cars and the Like, of which the following is a specification.

This invention relates to the indicator boards which are commonly displayed upon the exterior of tram-cars and other public conveyances to denote the destination or stopping places upon the route for the convenience of intending passengers or others who are without the car and refers more particularly to those devices of this nature in which any one of a number of names may be brought into view by turning a handle arranged upon the platform or within the car where it is impossible for the operator to see the board while making the selection.

To overcome the disadvantage above indicated, it has been proposed to employ mechanical indicating devices to register in view of the operator the various names as they appear upon the board. This method however, has been found unsatisfactory in practice owing to the fact that provision cannot be made for the insertion of additional names, while alterations of the displaying means, due to variations of temperature, to mechanical depreciation, or other causes, are not taken into account by the indicator which will in consequence register incorrectly.

The object of the present invention is to render the name displayed upon the board visible to the operator, thus securing the convenience of the mechanical register without the disadvantages above referred to.

In carrying this object into effect, the invention comprises a small optical instrument which is adapted to be mounted upon the roof of the car or other position in front of the destination board and provided with an eye-piece positioned conveniently for the operator who is enabled thereby to see, on a reduced scale, the name displayed.

Figure 1:
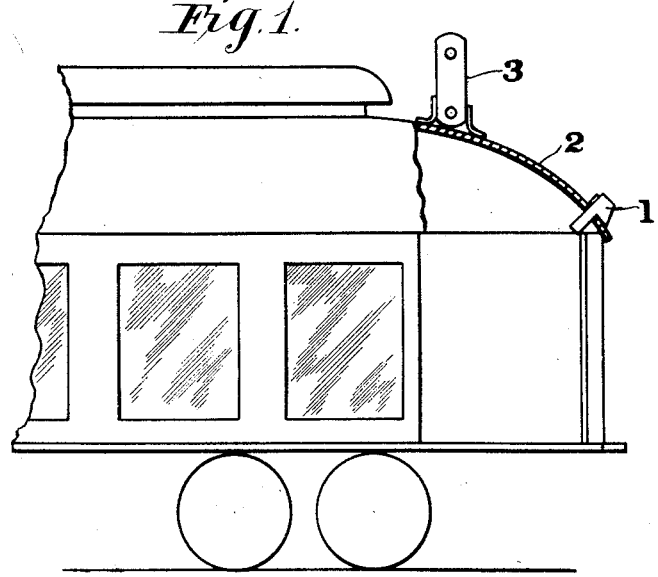
Figure 2:
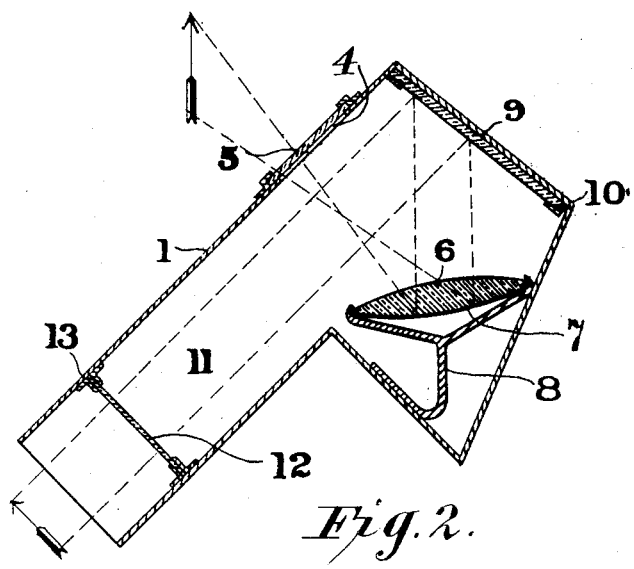

In order that the nature of the invention and its construction may be fully understood, reference will now be made to the accompanying sheet of drawings in which:—
Figure 1 illustrates the arrangement of the invention upon the car, and Fig. 2 is a sectional elevation of the invention about actual size.

The instrument comprises a casing 1 of suitable form and adapted to be mounted upon the roof 2 of the car or other suitable position so as to face the destination board 3, as shown in Fig. 1.

An aperture 4 is formed in the casing 1 upon the side facing the destination board, such opening being preferably covered by a glass screen 5 in order to exclude dust. The glass screen 5 may be detachable so as to give access to the interior. Arranged within the casing 1, opposite the aperture 4, is a convex lens 6, which is provided with a silvered or other reflecting backing 7. The said lens 6 is mounted, by a bracket 8 or other convenient means, at such an angle that it may sight through the aperture 4 an exterior object facing such aperture and reflect the image of such object on to a mirror 9 which is supported by clips 10 or other means upon the under surface of the upper side of the casing 1.

The casing 1 is formed with a projecting eye-piece 11 which extends downwardly through the roof 2 so as to permit of the mirror 9 being viewed by the operator when adjusting the sign upon the destination board. To prevent the entrance of dust, a suitable glass screen 12 may be arranged in the eye-piece 11 and supported in any convenient manner as by the clips 13.

The operation of the device is as follows:—The sign displayed upon the front of the destination board 3 is sighted by the convex lens 6 which reduces the image to the dimensions necessary to bring the whole sign within the compass of the instrument. By means of its backing the lens reflects the reduced image upon the mirror 9 at which position it will be visible from below through the eye-piece 11. It will be seen that the inverting action of the lens serves to cause the sign to appear upon the mirror the correct way up to the operator when facing in the same direction as the destination board, while owing to the fact that the sign is twice reflected within the instrument, the letters will be facing in the proper direction.

I claim:

1. A device of the character indicated comprising a casing provided with an opening in its upper portion, a mirror upon the under surface of the upper end thereof, and a convex lens provided with a reflecting backing arranged within said casing and adapted to sight through said opening an object exterior to such casing and to reflect the image on a reduced scale upon said mirror, said casing being provided with a second opening for permitting said mirror to be viewed from beneath said casing, substantially as and for the purpose set forth.

2. In a car and the like, in combination, a destination indicator, a casing provided with an opening facing said indicator, a convex lens having a reflecting backing mounted within said casing, said lens being positioned opposite said opening, and a reflector within said casing positioned to receive the reflected image from said lens and its reflecting backing, said casing being provided with a second opening through which a person on the car may observe said reflector.

In testimony whereof I have signed my name to this specification in the presence of two subscribing witnesses.

JAMES STEWART WEARN.

Witnesses:
PERCY RICHMOND CLIMIE,
CYRIL CARLYN COATES.